United States Patent
Wilhelm

(10) Patent No.: US 9,140,890 B1
(45) Date of Patent: Sep. 22, 2015

(54) ADJUSTABLE MAGNIFYING GLASS MOUNTING SYSTEM

(71) Applicant: Thomas Eugene Wilhelm, Chico, CA (US)

(72) Inventor: Thomas Eugene Wilhelm, Chico, CA (US)

(*) Notice: Subject to any disclaimer, the term of this patent is extended or adjusted under 35 U.S.C. 154(b) by 0 days.

(21) Appl. No.: 14/315,056

(22) Filed: Jun. 25, 2014

Related U.S. Application Data

(60) Provisional application No. 61/840,072, filed on Jun. 27, 2013.

(51) Int. Cl.
*G02B 7/02* (2006.01)
*G02B 25/00* (2006.01)

(52) U.S. Cl.
CPC .............. *G02B 25/002* (2013.01); *G02B 7/02* (2013.01); *G02B 25/005* (2013.01)

(58) Field of Classification Search
CPC ............ G02B 7/00; G02B 7/02; G02B 7/022; G02B 25/002; G02B 25/005; A61B 19/26; A61B 2019/267; A61B 2019/268; G06F 1/1609
USPC ............... 359/802, 811, 818, 819; 248/276.1, 248/278.1; 362/396, 804; 269/3, 6, 71; 132/73, 73.5
See application file for complete search history.

(56) References Cited

U.S. PATENT DOCUMENTS

| | | | | |
|---|---|---|---|---|
| 3,880,511 A | * | 4/1975 | Alonso Astarloa | 353/79 |
| 3,955,884 A | * | 5/1976 | Del Pesco, Sr. | 359/804 |
| 4,958,907 A | * | 9/1990 | Davis | 359/809 |
| 5,048,928 A | * | 9/1991 | Davis | 359/809 |
| 5,931,167 A | * | 8/1999 | Coleman | 132/73.5 |
| 5,999,339 A | * | 12/1999 | Kam et al. | 359/803 |
| 6,086,228 A | * | 7/2000 | McGowan et al. | 362/396 |
| 6,118,195 A | * | 9/2000 | Hauer | 310/75 R |
| 6,253,459 B1 | * | 7/2001 | Barnhill | 33/514.1 |
| 6,417,894 B1 | * | 7/2002 | Goff et al. | 348/832 |
| 8,294,998 B1 | * | 10/2012 | Samo | 359/802 |

* cited by examiner

*Primary Examiner* — Loha Ben
(74) *Attorney, Agent, or Firm* — Plager Schack LLP

(57) ABSTRACT

An adjustable mounting system to secure a magnifying glass to a point of attachment and enhance adjustability of the system to enable the magnifying glass to be oriented towards a magnification target is provided. The mounting system includes a support member detachably coupled to the point of attachment by a fastener, a cap rotatably mounted to the support member and able to enable an arm to slidably adjust relative to the cap, and a bracket rotatably mounted to an end of the arm and secured to the magnifying glass. The cap, arm and bracket are each adjusted to a desired position to enable the magnifying glass to be directed towards the magnification target.

10 Claims, 4 Drawing Sheets

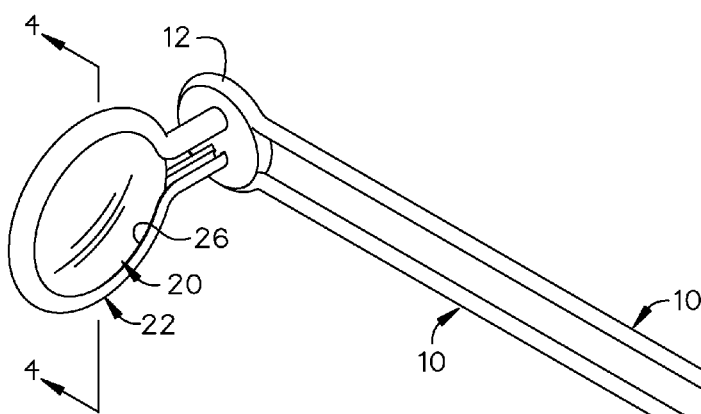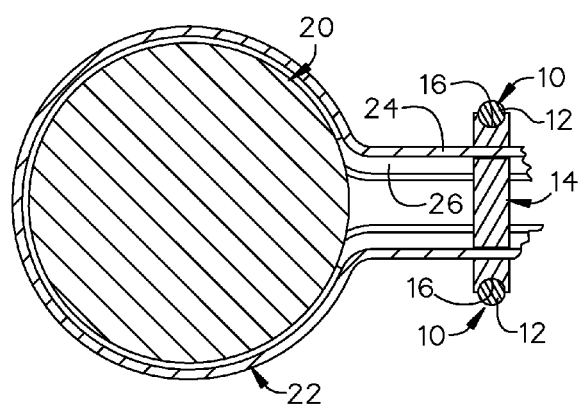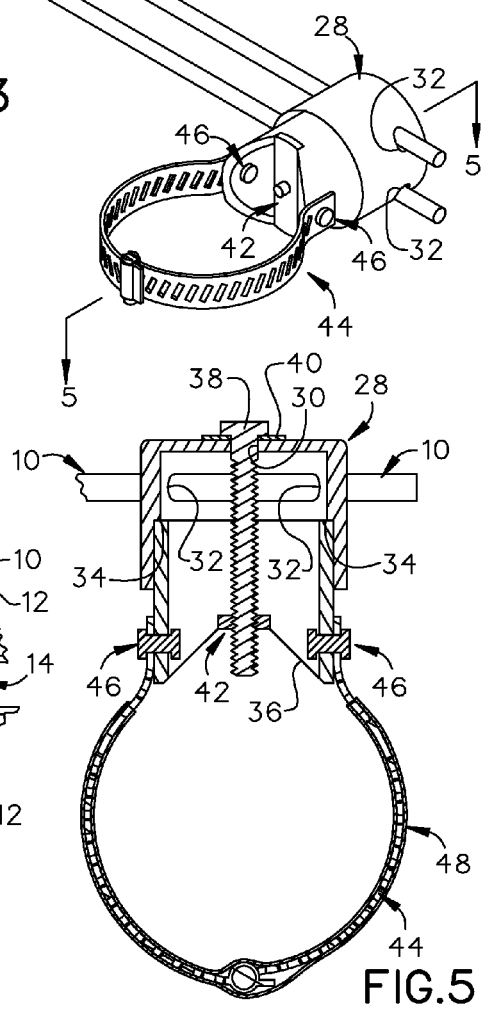

ADJUSTABLE MAGNIFYING GLASS MOUNTING SYSTEM

RELATED APPLICATION

The application claims priority to provisional patent application U.S. Ser. No. 61/840,072 filed on Jun. 27, 2013, the entire contents of which is herein incorporated by reference.

BACKGROUND

The embodiments herein relate generally to mounting devices for magnifying glasses.

Magnifying glasses are useful tools that allow individuals to closely examine details of a target of interest or provide a means for focusing artificial or natural light therein. This is useful in a variety of applications such as when a botanist is interested in studying the texture and shape of a plant's leaves, when a camper in an outdoor environment needs to heat or ignite a pile of leaves to start a fire, or an alternative purpose desired by a user.

Magnifying glass mounting devices are desirable because they allow users to operate them in a hands-free manner. This enables the user to complete a variety of tasks simultaneously while using the magnifying glass. Current magnifying glass mounting devices are designed to be mounted to fixed structures such as tables and other flat surfaces. However, these devices are limited because they cannot be used in the absence of a flat surface. This renders the devices ineffective and/or unusable in the presence of alternative natural and man made structures such as posts, tree limbs, machine components, braces, arms, legs, or other rodlike structures. In addition, these mounting devices are limited in their adjustment degrees and points, which make it difficult for users to focus the magnifying glass on a target.

As such, there is a need in the industry for a magnifying glass mounting system with enhanced adjustability and versatility for mounting to a variety of fixed structures.

SUMMARY

An adjustable mounting system configured to secure a magnifying glass to a point of attachment and enhance adjustability of the system to enable the magnifying glass to be oriented towards a magnification target is provided. The mounting system comprises a support member detachably coupled to the point of attachment by a fastener, a cap rotatably mounted to the support member and configured to enable an arm to slidably adjust relative to the cap, and a bracket rotatably mounted to an end of the arm and configured to secure the magnifying glass therein, wherein the cap, arm and bracket are each adjusted to a desired position to enable the magnifying glass to be directed towards the magnification target.

BRIEF DESCRIPTION OF THE FIGURES

The detailed description of some embodiments of the invention will be made below with reference to the accompanying figures, wherein the figures disclose one or more embodiments of the present invention.

FIG. 3 depicts a rear perspective view of certain embodiments of the magnifying glass mounting system with tubing 48 omitted for illustrative clarity;

FIG. 4 depicts a detailed section view of certain embodiments of the magnifying glass mounting system along line 4-4 in FIG. 3;

FIG. 5 depicts a detailed section view of certain embodiments of the magnifying glass mounting system along line 5-5 in FIG. 3;

DETAILED DESCRIPTION OF CERTAIN EMBODIMENTS

Figure 1:
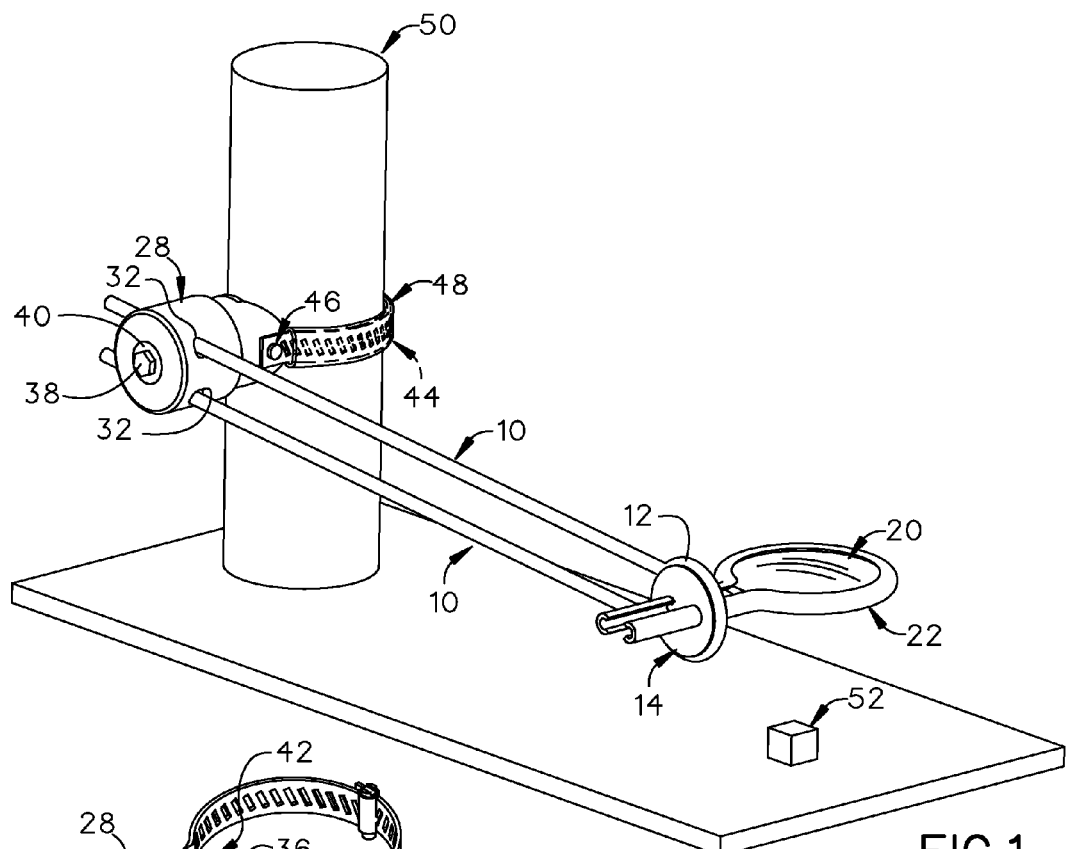
FIG. 1 depicts a perspective view of certain embodiments of the magnifying glass mounting system shown in use.
Figure 2:
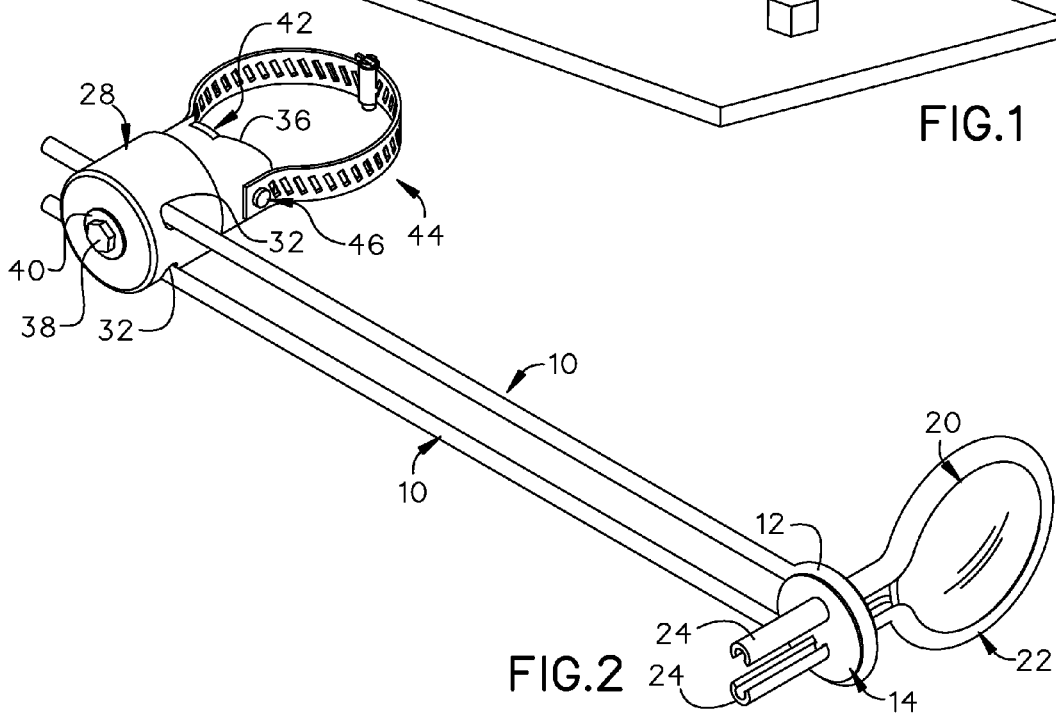
FIG. 2 depicts a front perspective view of certain embodiments of the magnifying glass mounting system with tubing 48 omitted for illustrative clarity.

As depicted in FIGS. 1-3, the magnifying glass mounting system is configured to secure lens 20 to attachment structure 50 and in a position such that lens 20 is directed towards magnification target 52. Lens 20 may be made from glass or plastic and have any dimensions. While FIG. 1 depicts attachment structure 50 as a cylindrical post, it shall be appreciated that the system may be secured to any alternatively shaped posts, tree limbs, machine components, braces, arms, legs, other rodlike structures, other irregularly shaped objects, or the like.

The mounting system comprises strap clamp 44, cap wedge 36, cap 28, arm 10, disc 14 and lens bracket 22. Strap clamp 44 may be made from metal or plastic and is secured to cap wedge 36 by rivets 46. Strap clamp 44 may have a screw/hex or thumb screw type adjustment component to allow the clamp to conform to contours of attachment structure 50 in a secured position. Although the screw adjustment component is depicted on a central portion of strap clamp 44, it shall be appreciated the screw component may be located on any alternative location of the clamp such as proximate an end of the clamp. In one embodiment, tubing 48 is disposed around strap clamp 44 to enhance friction between the clamp and attachment structure 50. In a preferred embodiment, tubing 48 is made from translucent vinyl.

Cap 28 and cap wedge 36 are both made from plastic and are positioned such that a portion of cap wedge 36 is disposed within a portion of cap 28. Cap wedge 36 is secured to cap 28 by bolt 38, washer 40 and long nut 42. This configuration allows cap 28 to rotate 360 degrees on top of cap wedge 36. Cap 28 comprises cap holes 32 to receive a pair of prongs of arm 10. Arm 10 is made from aluminum and comprises the pair of prongs connected to arm ring 12 at one end. When arm 10 is detached from cap 28, the pair of prongs are angled approximately 5-6 degrees apart from one another. Once the prongs are squeezed together such that the prongs are parallel to one another, the prongs can be inserted into cap holes 32 and be slidably adjusted relative to cap 28.

Lens bracket 22 is made from aluminum and is rotatably mounted to arm ring 12 of arm 10 via disc 14. In a preferred embodiment, disc 14 is made from plastic. Lens bracket 22 comprises bracket arms 24, which are inserted through slots 18 of disc 14. Lens 20 snap fits into concave track 26 of lens bracket 22. Alternatively, lens 20 may be secured to lens bracket 22 via straps or an adhesive such as glue. As depicted in the FIG. 4 section view, disc 14 comprises concave rim 16, which is configured to engage with arm ring 12. This allows lens 20 to rotate 360 degrees via the disc 14 and arm ring 12 connection.

Figure 6:
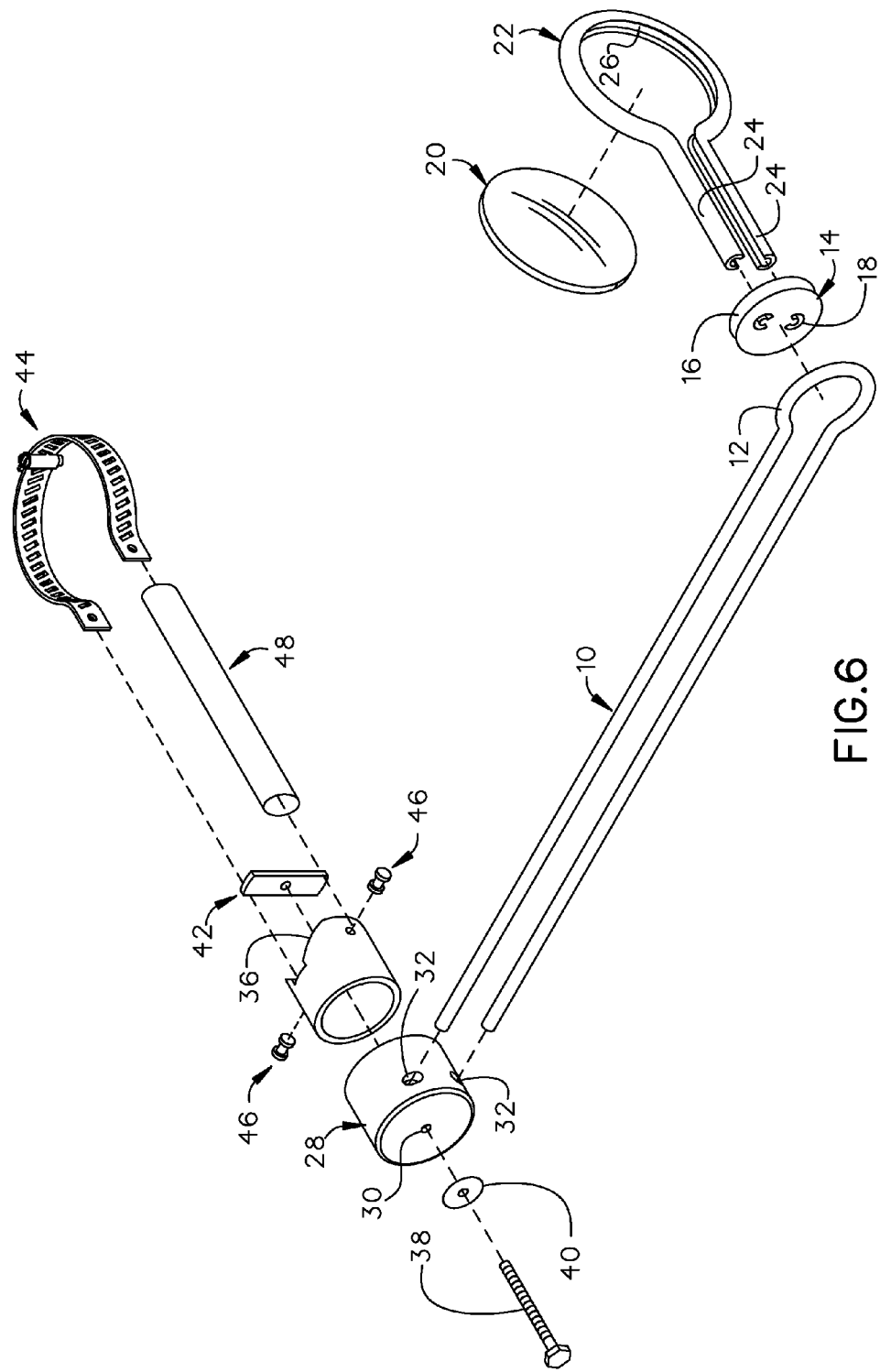
FIG. 6 depicts an exploded view of certain embodiments of the magnifying glass mounting system.
Figure 7:
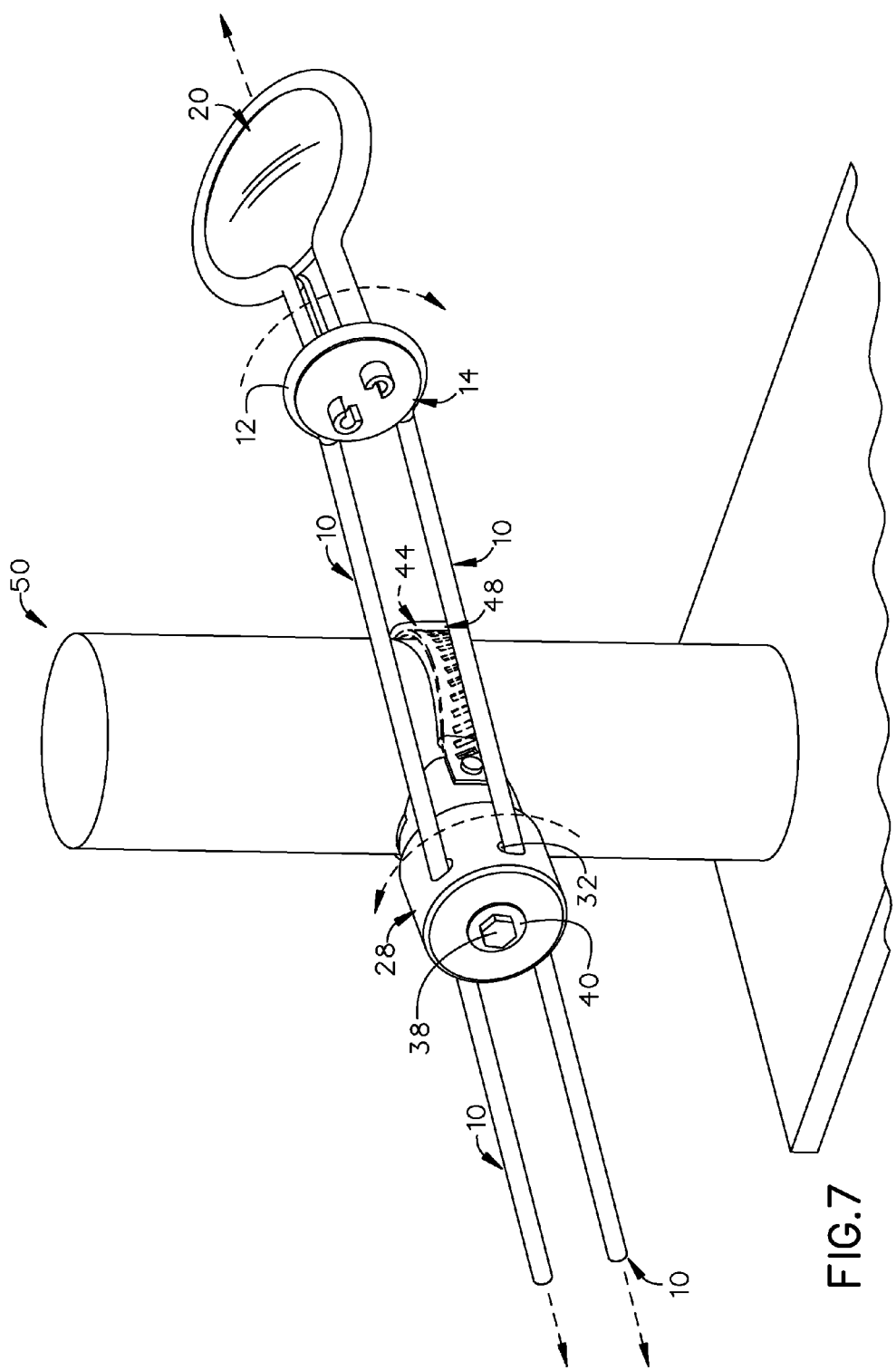
FIG. 7 depicts a perspective view of certain embodiments of the magnifying glass mounting system shown in use.

FIGS. 5-6 depict the connection of cap 28 and cap wedge 36 in more detail. Cap wedge 36 is placed against cap inner ledge 34. Bolt 38 is inserted through washer 40, cap hole 30 and long nut 42. The threads of bolt 38 engage with long nut 42, which secures cap 28 to cap wedge 36. To operate the magnifying glass mounting system, a user secures strap clamp 44 around attachment structure 50. The screw of strap clamp 44 is adjusted to tighten the clamp around attachment structure 50 to a locked position. The user squeezes the prongs of arm 10 together to slidably adjust arm 10 relative to cap 28. Once the user releases the prongs, arm 10 remains in a stationary position relative to cap 28. The user then rotates cap 28 and/or lens 20 to a desired position until lens 20 is directed towards magnification target 52. To disengage the mounting system, the user releases strap clamp 44 from attachment structure 50 by loosening the strap clamp screw.

It shall be appreciated that the components of the mounting system described in several embodiments herein may comprise any alternative known materials in the field and be of any color, size and/or dimensions. This allows the mounting system to accommodate any variety and sized lenses 20 and attachment structures 50. It shall be appreciated that the components of the mounting system described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An adjustable mounting system configured to secure a magnifying glass to a point of attachment and enhance adjustability of the system to enable the magnifying glass to be oriented towards a magnification target, the mounting system comprising:

a support member detachably coupled to the point of attachment by a fastener;

a cap rotatably mounted to the support member and configured to enable an arm to slidably adjust relative to the cap;

a bracket rotatably mounted to an end of the arm and configured to secure the magnifying glass therein, wherein the cap, the arm and the bracket are each adjusted to a desired position to enable the magnifying glass to be directed towards the magnification target.

2. The adjustable mounting system of claim 1, wherein the support member fastener comprises a strap clamp.

3. The adjustable mounting system of claim 2, wherein the strap clamp comprises an adjustable screw configured to enable the clamp to conform to contours of the point of attachment.

4. The adjustable mounting system of claim 2, further comprising a vinyl tubing disposed around the strap clamp to enhance friction between the strap clamp and the point of attachment.

5. The adjustable mounting system of claim 2, wherein the cap comprises apertures configured to receive a pair of prongs of the arm.

6. The adjustable mounting system of claim 5, wherein the arm end comprises a ring connected to the pair of arm prongs.

7. The adjustable mounting system of claim 6, wherein the bracket is rotatably mounted to the arm ring by a disc, wherein the disc comprises a concave rim configured to engage with the arm ring.

8. The adjustable mounting system of claim 7, wherein the disc comprises slots configured to receive arms of the bracket.

9. The adjustable mounting system of claim 8, wherein the bracket comprises a concave track configured to engage with the magnifying glass.

10. The adjustable mounting system of claim 9, wherein the point of attachment comprises a post.

* * * * *